(12) United States Patent
Randjelovic et al.

(10) Patent No.: US 12,141,642 B2
(45) Date of Patent: Nov. 12, 2024

(54) PAIR OF RESONANCE TRANSPONDERS

(71) Applicant: The Swatch Group Research and Development Ltd, Marin (CH)

(72) Inventors: Zoran Randjelovic, Corcelles (CH); Jérôme Maspoli, Gampelen (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 18/316,375

(22) Filed: May 12, 2023

(65) Prior Publication Data

US 2023/0394256 A1 Dec. 7, 2023

(30) Foreign Application Priority Data

Jun. 3, 2022 (EP) ..................................... 22177158

(51) Int. Cl.
*G06K 7/10* (2006.01)
*G06K 19/077* (2006.01)

(52) U.S. Cl.
CPC ..... *G06K 7/10336* (2013.01); *G06K 7/10297* (2013.01); *G06K 19/07758* (2013.01)

(58) Field of Classification Search
None
See application file for complete search history.

(56) References Cited

U.S. PATENT DOCUMENTS

| | | | |
|---|---|---|---|
| 2017/0040688 A1 | 2/2017 | Peralta et al. | |
| 2020/0160143 A1* | 5/2020 | Ali | G06K 19/072 |
| 2021/0075109 A1 | 3/2021 | Peralta et al. | |
| 2021/0081748 A1 | 3/2021 | Finn | |
| 2021/0182650 A1* | 6/2021 | Lotya | H04B 5/22 |
| 2022/0138522 A1 | 5/2022 | Lotya et al. | |

FOREIGN PATENT DOCUMENTS

| | | |
|---|---|---|
| JP | 2001-101370 A | 4/2001 |
| JP | 2009-217536 A | 9/2009 |
| JP | 2018-533238 A | 11/2018 |

OTHER PUBLICATIONS

European Search Report issued Oct. 28, 2022 in European Application 22177158.7 filed on Jun. 3, 2022 3 pages (with English Translation of Categories).
Notice of Reasons of Refusal issued in Japanese Patent Application No. 2023-084289 on Jul. 9, 2024. (w/ English translation).

\* cited by examiner

*Primary Examiner* — Kristy A Haupt
(74) *Attorney, Agent, or Firm* — Oblon, McClelland, Maier & Neustadt, L.L.P.

(57) ABSTRACT

A pair of transponders including a first transponder equipped with a first electronic system for managing the sending and the receiving of data and with a first antenna, the first electronic system being connected to the first antenna, the pair of transponders including a second transponder equipped with a second electronic system for managing the sending and the receiving of data and with a second antenna, the second electronic system being connected to the second antenna, wherein the second antenna is configured and disposed so that the second transponder forms a resonator circuit of the first antenna. A timepiece can include such a pair of transponders.

15 Claims, 1 Drawing Sheet

PAIR OF RESONANCE TRANSPONDERS

CROSS-REFERENCE TO RELATED APPLICATION

This application claims priority to European Patent Application No. 22177158.7 filed on Jun. 3, 2022, the entire disclosure of which is hereby incorporated herein by reference.

TECHNICAL FIELD OF THE INVENTION

The invention relates to the field of information transmissions and telecommunications, and in particular transponders including emitting and/or receiving antennas.

TECHNOLOGICAL BACKGROUND

Transponders are electronic devices configured to send and/or receive data. Passive RFID (Radio Frequency Identification) transponders exist, which are often intended to encode and record consumer products.

Other passive transponders are for example used in terminals and bank cards, for example for a contactless payment. These transponders are generally NFC (Near Field Communication) type, and enable data transfer at short distances.

Communication is established between two terminals, each terminal comprising an electronic system for managing and recording data, as well as an antenna for sending and receiving the data from the other terminal.

The antenna is of major importance for determining the emitting/receiving operating distance between the terminals, but the dimensions thereof must be very small to limit the size of the terminals. For this purpose, spiral portion-shaped antennas exist, which make it possible to have a sufficient antenna length in minimum space. The number of coils determines the inductance of the antenna. The connection points of the electronic system are arranged at the two ends of the spiral portion, i.e. at the outer end and at the inner end of the spiral portion to have a sufficient inductance and to arrive at a maximum communication distance.

When this is not enough, a second antenna is arranged in parallel with the first antenna, in order to increase the communication distance. The second antenna operates as a resonator circuit, such that the nominal frequency of the set of both antennas does not change with respect to the nominal frequency of the spiral portion alone. Thanks to the second antenna, an increase in the communication distance is obtained.

However, the second antenna occupies a volume that only serves for this. Thus, it has this single function of forming a resonator circuit.

Moreover, a transponder is generally configured to perform a single function. For example, a transponder has either the function of enabling payments, or of recording or passing a barrier in public transport.

Thus, to obtain a plurality of functions, it is necessary to combine a plurality of transponders.

SUMMARY OF THE INVENTION

The purpose of the invention is to remedy the aforementioned drawbacks, and aims to provide a pair of transponders making it possible to combine two different functions while keeping small antennas but ensuring the adequate communication distance.

The pair of transponders comprises a first transponder equipped with a first electronic system for managing the sending and the receiving of data and with a first antenna, the first electronic system being connected to the first antenna, the pair of transponders comprising a second transponder equipped with a second electronic system for managing the sending and the receiving of data and with a second antenna, the second electronic system being connected to the second antenna.

The pair of transponders is noteworthy in that the second antenna is disposed and configured so that the second transponder forms a resonator circuit of the first antenna.

Thus, the two transponders make it possible, on the one hand, to combine two different functions in the same electronic device, and on the other hand, each transponder forms a resonator circuit for the other transponder in order to improve the communication distance.

Indeed, the resonator circuit formed by the second transponder, and in particular by its antenna enables the communication distance of the spiral antenna to be improved by 10 to 20%. Thus, the transponders can comply with specific operating standards while retaining a small size.

Thanks to the invention, specific electronic devices can be used, for example a watch type timepiece, for NFC type data transfer uses, and that have two functions. In particular, this watch can be equipped with a payment system usable as a bank payment card at short distances, and another function.

According to a specific embodiment of the invention, the first antenna is configured and disposed so that the first transponder forms a resonator circuit of the second antenna.

According to a specific embodiment of the invention, the first and the second antenna are arranged in continuity with each other.

According to a specific embodiment of the invention, the first antenna comprises a first set of coils, and the second antenna comprises a second set of coils.

According to a specific embodiment of the invention, the first set of coils and the second set of coils at least partly form a spiral.

According to a specific embodiment of the invention, the first set of coils and the second set of coils are separated, such that the spiral is discontinuous, a gap being arranged at the boundary of the first set of coils and of the second set of coils.

According to a specific embodiment of the invention, the spiral comprises a third set of coils beyond the second set of coils and the first set of coils.

According to a specific embodiment of the invention, the third set of inner coils is free of connection.

According to a specific embodiment of the invention, the second transponder is inactive, when the first transponder is active, and the first transponder is inactive when the second transponder is active.

According to a specific embodiment of the invention, the first electronic system and the second electronic system each include a capacitor, such that each resonator circuit comprises a capacitor arranged in parallel with the first or the second set of coils According to a specific embodiment of the invention, the first transponder has a first function, for example of payment, and the second transponder has a second function different from the first function, for example of access control.

According to a specific embodiment of the invention, the transponders are NFC type, particularly to serve as a method of payment.

According to a specific embodiment of the invention, the first set of coils, and the second set of coils, and the third set of coils extend in the same plane.

The invention also relates to an electronic device comprising such a pair of transponders.

According to a specific embodiment of the invention, the electronic device is a timepiece, such as a watch.

According to a specific embodiment of the invention, the spiral forms a dial of the timepiece.

BRIEF DESCRIPTION OF THE FIGURES

The purposes, advantages and features of the present invention will become apparent upon reading several embodiments given purely by way of non-limiting examples, making reference to the accompanying drawings, wherein.

DETAILED DESCRIPTION OF THE INVENTION

Figure 1:
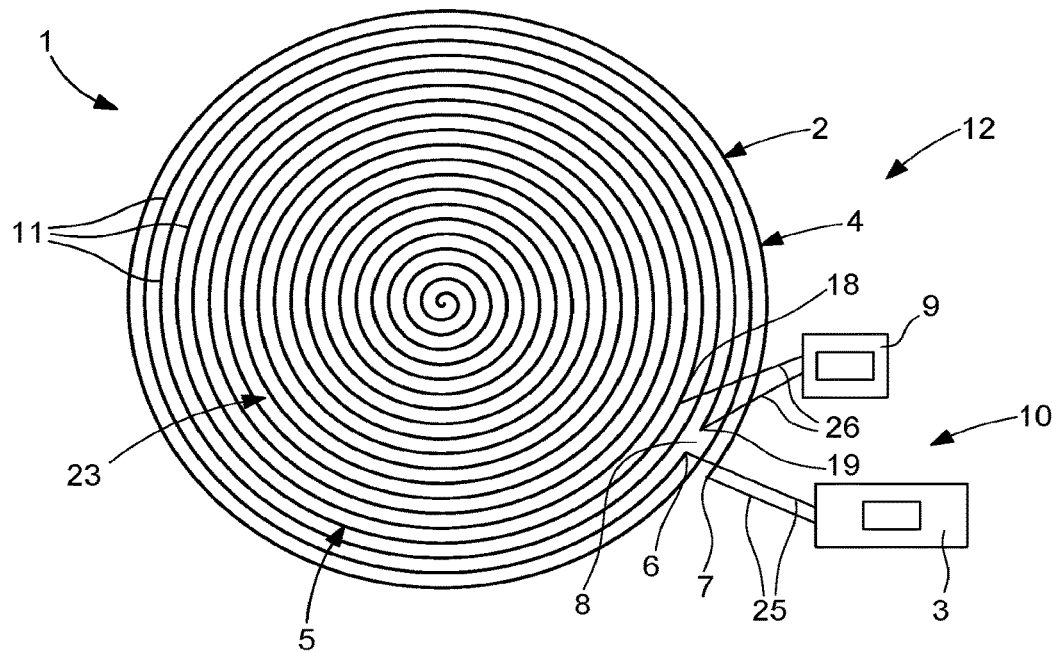
FIG. 1 shows a schematic representation of a top view of a first embodiment of a pair of transponders according to the invention.

FIG. 1 shows one embodiment of a pair of transponders 1 comprising a first transponder 10 and a second transponder 12.

The communication protocol is for example NFC (Near Field Communication) type. This technology is used in particular for payment methods, for example for payment cards, which can pay remotely using so-called "contactless" terminals.

The first transponder 10 includes a first electronic system 3 for managing the sending and the receiving of data and the second transponder 12 includes a second electronic system 9 for managing the sending and the receiving of data. The pair of transponders 1 further comprises an antenna in the shape of a spiral 2.

The spiral 2 includes a wound strip forming a plurality of concentric coils 11, which extends substantially in the same plane in order to minimise the thickness of the antenna. Thus, all the coils 11 of the spiral 2 are wound in the same plane.

The first electronic system 3 and the second electronic system 9 are for example integrated circuits equipped with a chip configured to manage NFC type communications.

Each electronic system 3, 9 is connected to the spiral 2 by two connection points 6, 7, 18, 19 arranged on the strip.

A first pair of wires 25 connects the two connection points 6, 7 to the first electronic system 3. A second pair of wires 26 connects the two connection points 18, 19 to the second electronic system 3. The wires 25, 26 are for example soldered, or glued with a conductive glue, to the connection points 6, 7, 18, 19 and to the integrated circuit.

The coils 11 between the two connection points 6, 7 of the first transponder 10 form a first set of coils 4, and therefore a first antenna of the first transponder 10. The first set of coils 4 comprises a plurality of the most off-centred adjacent coils of the spiral 2, and of which the radius of curvature is the highest. In FIG. 1, the first set of coils 4 comprises two complete coils. The first set of coils 4 can obviously comprise more thereof, for example three, four, five or more, or a single coil or a portion of a coil.

The coils 11 between the two connection points 18, 19 of the second transponder 12 form a second set of coils 5, and therefore a second antenna of the second transponder 12. The second set of coils 5 comprises a plurality of adjacent coils, which follow the coils 11 of the first set of coils 4. The coils 11 of the second set of coils 5 are more concentric than those of the first set of coils 4. They have a radius of curvature smaller than that of the coils of the first set of coils 4.

The first two connection points 6, 7 are preferably arranged at the two ends of the first set of outer coils 4. In other words, the two connection points 6, 7 are respectively arranged at the most off-centred point and at the most concentric point of the first set of coils 4.

The second two connection points 18, 19 are preferably arranged at the two ends of the first set of coils 5. Thus, the second two connection points 18, 19 are respectively arranged at the most off-centred point and at the most concentric point of the first set of coils 5.

In the embodiment shown in FIG. 1, the first set of coils 4 and the second set of coils 5 are separated, such that the spiral 2 is discontinuous. In other words, the spiral 2 comprises two separate portions separated by a gap 8 arranged at the boundary of the first set of coils 4 and of the second set of coils 5. Thus, the two sets of coils 4, 5 are not directly connected to each other.

The gap 8 is preferably disposed after the most concentric connection point 6 of the two connection points 6, 7. Thus, the two connection points 6, 7 are therefore not connected to the second set of coils 5.

In this embodiment, the spiral 2 includes a third set of coils 23 extending outside of the connection points 6, 7 of the first 10 and of the second transponder 12. Furthermore, the third set of coils 23 is free of connection. In other words, there is no connection on the third set of coils 23, either with the first electronic system 3 or the second electronic system 9. The most concentric coils 11 of the spiral 2 form the third set of coils 23.

In FIG. 1, the third set of coils 23 comprises all the inner coils 11 from the most concentric connection point 18 of the spiral 2. Thus, the third set of coils 23 comprises here at least twenty-five coils. It can obviously comprise fewer or more thereof, for example around ten, twenty, thirty coils or more.

The third set of coils 23 makes it possible to improve the remote data transmission range between these transponders 10, 12 and another transponder or a terminal. Indeed, the third set of coils 23 makes it possible to store more energy than the first set of coils 4 or the second set of coils 5 alone. This additional energy thus makes it possible to increase the transmission distance.

The first set of coils 4 and the second set of coils 5 and the third set of coils 23 extend in the same plane.

In this embodiment, the first transponder 10 forms a resonator circuit of the second transponder 12, and the second transponder 12 forms a resonator circuit of the first transponder 10. A resonator circuit makes it possible to improve the communication range of a transponder antenna.

Preferably, the second transponder 12 is inactive, when the first transponder 10 is active, and the first transponder 10 is inactive when the second transponder 12 is active, to prevent possible interferences in the communications of each transponder 10, 12.

Preferably, the first 3 and the second electronic system 9 each comprise a capacitor. Thus, each capacitor is connected in parallel with the corresponding set of coils 11. Thanks to a resonator circuit equipped with a capacitor, each transponder 10, 12 further increases the range of the data transfer by 30 to 40%.

Furthermore, this pair of transponders 1 makes it possible to combine two different functions. Thus, the first transponder 10 has a first function, and the second transponder 12 has a second function. The second function is preferably different from the first function.

For example, the first function is a payment function, similar to a bank card, and the second function is an access control or ticketing function.

Such a pair of transponders 1 can be used in an electronic product. For example, a timepiece configured to make payments like a bank card. The NFC type transponder enables for example payment at short distances, referred to as "contactless".

Preferably, the transponder having the most efficient antenna is combined with the most demanding function concerning the standards required for the communication distance, for example for the payment function.

The first antenna having the best range, the first transponder 10 is selected for this more demanding function. Thus, it is possible to comply with standards more easily.

Figure 2:
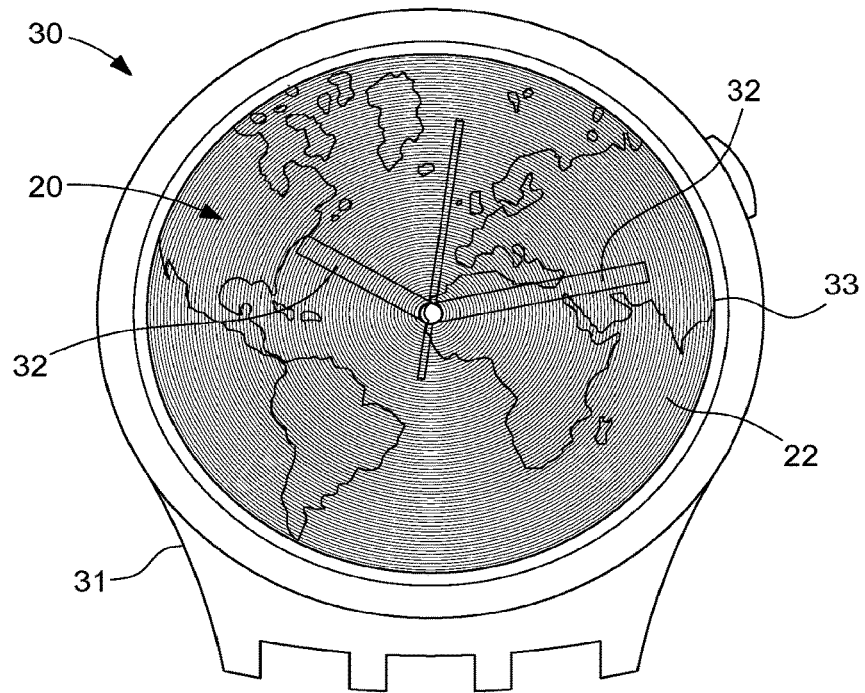
FIG. 2 shows a schematic representation of a top view of a watch including a pair of transponders according to the invention.

FIG. 2 shows a watch 30 comprising a pair of transponders according to the invention. The watch 30 comprises a case 31, housing a horological movement, preferably an electronic movement, and hands 32 to indicate the time. The pair of transponders 1 is also disposed in the case 31. In this embodiment, the spiral 22 of the pair of transponders is used as a dial of the watch 30. The spiral 22 is arranged under the crystal 33 of the watch 30. The hands 32 move above the spiral 22, the spiral 22 being visible through the crystal 33 by a user. The electronic systems 3 and the contact points are arranged under the spiral 22 in order to be hidden.

Optionally, the top surface of the spiral 22 comprises a pattern, for a decorative purpose or to indicate hour indices for example.

It goes without saying that the invention is not limited to the transponder and electronic device embodiments described with reference to the figures and alternatives can be considered without departing from the scope of the invention. For example, the shapes of antennas and their arrangements can be different in other embodiments.

The invention claimed is:

1. A pair of transponders comprising:
    a first transponder equipped with a first electronic system for managing sending and receiving of data and with a first antenna, the first electronic system being connected to the first antenna; and
    a second transponder equipped with a second electronic system for managing sending and receiving of data and with a second antenna, the second electronic system being connected to the second antenna,
    wherein the second antenna is configured and disposed so that the second transponder forms a resonator circuit of the first antenna.

2. The pair of transponders according to claim 1, wherein the first antenna is configured and disposed so that the first transponder forms a resonator circuit of the second antenna.

3. The pair of transponders according to claim 1, wherein the first and the second antenna are arranged in continuity with each other.

4. The pair of transponders according to claim 1, wherein the first antenna comprises a first set of coils, and the second antenna comprises a second set of coils.

5. The pair of transponders according to claim 4, wherein the first set of coils and the second set of coils at least partly form a spiral.

6. The pair of transponders according to claim 5, wherein the first set of coils and the second set of coils are separated, such that the spiral antenna is discontinuous, a gap being arranged at the boundary of the first set of coils and of the second set of coils.

7. The pair of transponders according to claim 5, wherein the spiral comprises a third set of coils beyond the second set of coils.

8. The pair of transponders according to claim 7, wherein the third set of inner coils is free of connection.

9. The pair of transponders according to claim 1, wherein the second transponder is inactive, when the first transponder is active, and the first transponder is inactive when the second transponder is active.

10. The pair of transponders according to claim 1, wherein the first electronic system and the second electronic system each include a capacitor, such that each resonator circuit comprises a capacitor arranged in parallel with the first or the second set of coils.

11. The pair of transponders according to claim 1, wherein the first transponder has a first function, for example of payment, and the second transponder has a second function different from the first function, for example of access control.

12. The pair of transponders according to claim 1, wherein said transponders are NFC transponders configured to serve as a method of payment.

13. An electronic device comprising a pair of transponders according to claim 1.

14. The electronic device according to claim 13, wherein the electronic device is a timepiece.

15. The electronic device according to claim 14, wherein the spiral forms a dial of the timepiece.

* * * * *